(12) United States Patent
Yu et al.

(10) Patent No.: US 8,723,432 B2
(45) Date of Patent: May 13, 2014

(54) CAPACITIVE FULL-WAVE CIRCUIT FOR LED LIGHT STRINGS

(75) Inventors: Jing Jing Yu, El Monte, CA (US); Lianfeng Ma, Guangde (CN)

(73) Assignee: 1 Energy Solutions, Inc., Agoura Hills, CA (US)

( * ) Notice: Subject to any disclaimer, the term of this patent is extended or adjusted under 35 U.S.C. 154(b) by 57 days.

(21) Appl. No.: 13/482,090

(22) Filed: May 29, 2012

(65) Prior Publication Data

US 2012/0233854 A1    Sep. 20, 2012

Related U.S. Application Data

(63) Continuation of application No. 12/431,098, filed on Apr. 28, 2009, now Pat. No. 8,314,564.

(60) Provisional application No. 61/111,253, filed on Nov. 4, 2008.

(51) Int. Cl.
*H05B 37/00* (2006.01)

(52) U.S. Cl.
USPC ..... 315/185 R; 315/193; 315/312; 315/185 S (58) Field of Classification Search
USPC .......... 315/291, 299, 360, 185 R, 192, 200 R, 315/312, 187, 205, 246, 207, 206, 200 A, 315/324; 362/227, 230, 231, 234, 235, 236, 362/237, 240, 252, 569, 810, 807, 812, 808
See application file for complete search history.

(56) References Cited

U.S. PATENT DOCUMENTS

| | | |
|---|---|---|
| 1,694,997 A | 12/1928 | VanHorn |
| 3,425,027 A | 1/1969 | Uberbacher |
| 3,519,913 A | 7/1970 | Janecek |
| 3,593,038 A | 7/1971 | Hylten-Cavallius |
| 3,639,822 A | 2/1972 | Brown |
| 3,758,771 A | 9/1973 | Frohardt |
| 4,035,681 A | 7/1977 | Savage |
| 4,074,165 A | 2/1978 | Moriyama |

(Continued)

FOREIGN PATENT DOCUMENTS

CA    2342321    3/2000

OTHER PUBLICATIONS

U.S. Appl. No. 12/542,903, filed Aug. 18, 2009, by Beijing Yu.

(Continued)

*Primary Examiner* — Alexander H Taningco
*Assistant Examiner* — Christopher Lo
(74) *Attorney, Agent, or Firm* — William W. Cochran; Cochran Freund & Young LLC (57) ABSTRACT

A capacitive full-wave circuit for LED light strings makes use of capacitors and diodes together to drive a LED string with full AC waves. Different from the conventional four-diode full-wave rectifying circuit, one embodiment of capacitive full-wave circuit includes two capacitors and two diodes. Because of the large imaginary impedance, the capacitors not only limit and the voltage and current through the LEDs, but also consume almost no electrical power. The electrical current-voltage performance can be further improved by introducing four resistors with a cost of some additional power consumption. A LED light string module with the capacitive full-wave circuit is also presented, with the capacitive full-wave circuit integrated inside of a front power plug and a back power socket.

6 Claims, 5 Drawing Sheets

(56) References Cited

U.S. PATENT DOCUMENTS

| | | |
|---|---|---|
| 4,223,248 A | 9/1980 | Tong |
| 4,298,869 A | 11/1981 | Okuno |
| 4,316,125 A | 2/1982 | Noguchi |
| 4,321,598 A | 3/1982 | Warner |
| 4,329,625 A | 5/1982 | Nishizawa |
| 4,348,663 A | 9/1982 | Yanagishima |
| 4,365,244 A | 12/1982 | Gillessen |
| 4,367,471 A | 1/1983 | Gillessen |
| 4,396,823 A | 8/1983 | Nihei |
| 4,492,952 A | 1/1985 | Miller |
| 4,521,835 A | 6/1985 | Meggs |
| 4,528,619 A | 7/1985 | Dolan |
| 4,595,920 A | 6/1986 | Runyan |
| 4,652,981 A | 3/1987 | Glynn |
| 4,675,575 A | 6/1987 | Smith |
| 4,727,603 A | 3/1988 | Howard |
| 4,728,849 A | 3/1988 | Morris et al. |
| 4,807,098 A | 2/1989 | Ahroni |
| 4,839,777 A | 6/1989 | Janko |
| 4,843,280 A | 6/1989 | Lumbard |
| 4,857,920 A | 8/1989 | Kataoka |
| 4,954,822 A | 9/1990 | Borenstein |
| 4,959,766 A | 9/1990 | Jain |
| 4,967,330 A | 10/1990 | Bell et al. |
| 5,087,212 A | 2/1992 | Hanami |
| 5,130,897 A | 7/1992 | Kuzma |
| 5,155,669 A | 10/1992 | Yamuro |
| 5,187,377 A | 2/1993 | Katoh |
| 5,193,895 A | 3/1993 | Naruke |
| 5,239,872 A | 8/1993 | Meyer-Bisch |
| 5,257,020 A | 10/1993 | Morse |
| 5,313,187 A | 5/1994 | Choi |
| 5,321,593 A | 6/1994 | Moates |
| 5,323,305 A | 6/1994 | Ikeda |
| 5,366,780 A | 11/1994 | Rapisarda |
| 5,368,503 A | 11/1994 | Savage |
| 5,404,282 A | 4/1995 | Klinke |
| 5,410,458 A | 4/1995 | Bell |
| 5,436,809 A | 7/1995 | Brassier |
| 5,457,450 A | 10/1995 | Deese |
| 5,463,280 A | 10/1995 | Johnson |
| 5,481,444 A | 1/1996 | Schultz |
| 5,499,174 A | 3/1996 | Lin |
| 5,504,514 A | 4/1996 | Nelson |
| 5,528,484 A | 6/1996 | Hayashi |
| 5,567,037 A | 10/1996 | Ferber |
| 5,580,156 A | 12/1996 | Suzuki et al. |
| 5,580,159 A | 12/1996 | Liu |
| 5,588,863 A | 12/1996 | Wu |
| 5,634,711 A | 6/1997 | Kennedy et al. |
| 5,647,759 A | 7/1997 | Lien |
| 5,649,755 A | 7/1997 | Rapisarda |
| 5,655,830 A | 8/1997 | Ruskouski |
| 5,660,560 A | 8/1997 | Chong |
| 5,663,719 A | 9/1997 | Deese |
| 5,670,847 A | 9/1997 | Lin |
| 5,672,000 A | 9/1997 | Lin |
| 5,681,107 A | 10/1997 | Wang |
| 5,688,042 A | 11/1997 | Madadi et al. |
| 5,718,502 A | 2/1998 | Tseng |
| 5,720,544 A | 2/1998 | Shu |
| 5,722,860 A | 3/1998 | Pan |
| 5,726,535 A | 3/1998 | Yan |
| 5,762,419 A | 6/1998 | Yan |
| 5,777,868 A | 7/1998 | Gibboney, Jr. |
| 5,806,965 A | 9/1998 | Deese |
| 5,808,592 A | 9/1998 | Mizutani |
| 5,887,967 A | 3/1999 | Chang |
| 5,890,794 A | 4/1999 | Abtahi |
| 5,936,599 A | 8/1999 | Reymond |
| 5,941,626 A | 8/1999 | Yamuro |
| 5,962,971 A | 10/1999 | Chen |
| 5,969,469 A | 10/1999 | Wang |
| 5,988,831 A | 11/1999 | Pan |
| 6,022,241 A | 2/2000 | Lin |
| 6,048,074 A | 4/2000 | Wang |
| 6,072,280 A | 6/2000 | Allen |
| 6,079,848 A | 6/2000 | Ahroni |
| 6,120,312 A | 9/2000 | Shu |
| 6,183,104 B1 | 2/2001 | Ferrara |
| 6,183,310 B1 | 2/2001 | Shu |
| 6,190,021 B1 | 2/2001 | Huang |
| 6,194,839 B1 | 2/2001 | Chang |
| 6,200,003 B1 | 3/2001 | Tseng |
| 6,220,722 B1 | 4/2001 | Begemann |
| 6,227,679 B1 | 5/2001 | Zhang |
| 6,234,649 B1 | 5/2001 | Katougi |
| 6,283,797 B1 | 9/2001 | Wu |
| 6,361,192 B1 | 3/2002 | Fussell et al. |
| 6,361,198 B1 | 3/2002 | Reed |
| 6,367,952 B1 | 4/2002 | Gibboney |
| 6,382,812 B1 | 5/2002 | Hsu |
| 6,461,019 B1 | 10/2002 | Allen |
| 6,478,455 B2 | 11/2002 | Ahroni |
| 6,489,728 B2 | 12/2002 | Guthrie et al. |
| 6,505,954 B2 | 1/2003 | Chen |
| 6,550,953 B1 | 4/2003 | Ichikawa et al. |
| D474,848 S | 5/2003 | Lodhie |
| D474,849 S | 5/2003 | Lodhie |
| 6,565,244 B1 | 5/2003 | Murphy et al. |
| 6,598,996 B1 | 7/2003 | Lodhie |
| 6,648,495 B1 | 11/2003 | Hsu |
| 6,659,632 B2 | 12/2003 | Chen |
| 6,659,932 B2 | 12/2003 | Campbell, Jr. et al. |
| D485,379 S | 1/2004 | Steklenbug |
| 6,709,132 B2 | 3/2004 | Ishibashi |
| 6,717,526 B2 | 4/2004 | Martineau |
| 6,739,733 B1 | 5/2004 | Lamke et al. |
| 6,758,578 B1 | 7/2004 | Chou |
| 6,796,688 B2 | 9/2004 | Huang |
| 6,830,358 B2 | 12/2004 | Allen |
| 6,869,313 B2 | 3/2005 | Gibboney, Jr. |
| 7,012,379 B1 | 3/2006 | Chambers et al. |
| 7,014,352 B2 | 3/2006 | Wu |
| 7,045,965 B2 | 5/2006 | Yu et al. |
| 7,063,442 B2 | 6/2006 | Sugar |
| 7,066,628 B2 | 6/2006 | Allen |
| 7,066,636 B2 | 6/2006 | Wu |
| 7,086,756 B2 | 8/2006 | Maxik |
| 7,118,249 B2 | 10/2006 | Hsu et al. |
| 7,172,314 B2 | 2/2007 | Currie et al. |
| 7,217,005 B2 | 5/2007 | Lin |
| 7,220,022 B2 | 5/2007 | Allen et al. |
| 7,250,730 B1 | 7/2007 | Allen |
| 7,276,858 B2 | 10/2007 | Allen |
| 7,344,275 B2 | 3/2008 | Allen et al. |
| 7,350,936 B2 | 4/2008 | Ducharme et al. |
| 7,377,802 B2 | 5/2008 | Allen |
| 7,396,142 B2 | 7/2008 | Laizure, Jr. et al. |
| 7,488,094 B2 | 2/2009 | Murayama et al. |
| 7,518,316 B2 | 4/2009 | Yu |
| 7,575,362 B1 | 8/2009 | Hsu |
| 7,661,852 B2 | 2/2010 | Yu |
| 7,784,993 B2 | 8/2010 | Yu |
| 7,794,124 B2 | 9/2010 | Hulsey et al. |
| 7,850,361 B2 | 12/2010 | Yu |
| 7,850,362 B2 | 12/2010 | Yu |
| 7,852,011 B2 * | 12/2010 | Peng .................. 315/185 R |
| 7,883,261 B2 | 2/2011 | Yu |
| 7,963,670 B2 | 6/2011 | Yu |
| 8,016,440 B2 | 9/2011 | Yu |
| 8,083,393 B2 | 12/2011 | Yu |
| 2002/0043943 A1 | 4/2002 | Menzer et al. |
| 2002/0097586 A1 | 7/2002 | Horowitz |
| 2002/0105438 A1 | 8/2002 | Forbes |
| 2003/0025120 A1 | 2/2003 | Chang |
| 2003/0079387 A1 | 5/2003 | Derose |
| 2003/0147245 A1 | 8/2003 | Chen |
| 2003/0198048 A1 | 10/2003 | Frederick |
| 2004/0042205 A1 | 3/2004 | Tanabe et al. |
| 2004/0114367 A1 | 6/2004 | Li |
| 2004/0135522 A1 | 7/2004 | Berman |
| 2004/0140892 A1 | 7/2004 | Hanood |
| 2004/0184270 A1 | 9/2004 | Halter |

(56) References Cited

U.S. PATENT DOCUMENTS

| | | |
|---|---|---|
| 2004/0190289 A1 | 9/2004 | Liu |
| 2004/0190290 A1 | 9/2004 | Zerphy et al. |
| 2004/0233145 A1 | 11/2004 | Chiang |
| 2005/0047729 A1 | 3/2005 | Vilgiate |
| 2005/0057187 A1 | 3/2005 | Catalano |
| 2005/0162851 A1 | 7/2005 | Kazar et al. |
| 2005/0174769 A1 | 8/2005 | Yong et al. |
| 2005/0213324 A1 | 9/2005 | Chen |
| 2006/0007679 A1 | 1/2006 | Allen |
| 2006/0012349 A1 | 1/2006 | Allen |
| 2006/0012997 A1 | 1/2006 | Catalano |
| 2006/0028194 A1 | 2/2006 | Bosch |
| 2006/0044788 A1 | 3/2006 | Damrau |
| 2006/0098442 A1 | 5/2006 | Yu |
| 2006/0180822 A1 | 8/2006 | Yu |
| 2006/0181884 A1 | 8/2006 | Li |
| 2006/0203482 A1 | 9/2006 | Allen |
| 2006/0256585 A1 | 11/2006 | Pan |
| 2006/0270250 A1 | 11/2006 | Allen |
| 2006/0291256 A1 | 12/2006 | Cobbler |
| 2007/0025109 A1 | 2/2007 | Yu |
| 2007/0064450 A1 | 3/2007 | Chiba et al. |
| 2007/0183153 A1 | 8/2007 | Yu |
| 2007/0241357 A1 | 10/2007 | Yan |
| 2008/0024071 A1 | 1/2008 | Yu |
| 2008/0025024 A1 | 1/2008 | Yu |
| 2008/0094857 A1 | 4/2008 | Smith et al. |
| 2008/0143234 A1 | 6/2008 | Yu |
| 2008/0157686 A1* | 7/2008 | Chung et al. ............... 315/185 S |
| 2008/0186704 A1 | 8/2008 | Chou et al. |
| 2008/0258649 A1 | 10/2008 | Yu |
| 2008/0285279 A1 | 11/2008 | Ng et al. |
| 2009/0059565 A1 | 3/2009 | Bertram |
| 2009/0116236 A1 | 5/2009 | Chiang |
| 2009/0213602 A1 | 8/2009 | Gallegos |
| 2010/0067222 A1 | 3/2010 | Yu |
| 2010/0073963 A1 | 3/2010 | Yu |
| 2010/0109560 A1 | 5/2010 | Yu |
| 2010/0264806 A1 | 10/2010 | Yu |

OTHER PUBLICATIONS

Chinese Patent Application No. 200920172743.1 filed Apr. 20, 2009 by Jing Jing Yu.
U.S. Appl. No. 09/339,616; Inventor: Tuyet Thi Vo; abandoned.
U.S. Appl. No. 09/378,631, Inventor: Tuyet Thi Vo; abandoned.
U.S. Appl. No. 11/716,788, filed Mar. 12, 2007, by Jing Jing Yu.
U.S. Appl. No. 12/610,117, filed Oct. 30, 2009, by Jing Jing Yu.
U.S. Appl. No. 61/043,262, filed Apr. 8, 2008, by Jing Jing Yu.
U.S. Appl. No. 60/949,804, filed Jul. 13, 2007, by Jing Jing Yu.
U.S. Appl. No. 12/834,949, filed Jul. 13, 2010, by Jing Jing Yu.
U.S. Appl. No. 12/431,098, filed Apr. 28, 2009, by Jing Jing Yu.
U.S. Appl. No. 11/350,343, filed Feb. 9, 2006, by Jing Jing Yu.
Non-Final Office Action mailed Sep. 12, 2012 in U.S. Appl. No. 12/431,098, filed Apr. 28, 2009.
Final Office Action mailed Apr. 17, 2012 in U.S. Appl. No. 12/431,098, filed Apr. 28, 2009.

* cited by examiner

CAPACITIVE FULL-WAVE CIRCUIT FOR LED LIGHT STRINGS

CROSS-REFERENCE TO RELATED APPLICATION

This application is a continuing application of U.S. application Ser. No. 12/431,098, filed 28 Apr. 2009, by Jing Jing Yu and Ma Lianfeng, entitled "A Capacitive Full-Wave Circuit for LED Light Strings," which application is based upon and claims the benefit of U.S. provisional application No. 61/111,253, entitled "A Capacitive Full-Wave Circuit for LED Light Strings," filed Nov. 4, 2008, the entire disclosures of which are herein specifically incorporated by reference for all that they disclose and teach.

BACKGROUND OF THE INVENTION

LEDs have been widely used for decorative lighting purposes because of their low cost, low electrical power consumption, and long life time. For example, LED light strings have taken the place of many conventional incandescent light strings.

Different from conventional incandescent bulbs that are not sensitive to the electrical current direction, LEDs work only with current in a specific (positive) direction. Therefore, if an LED light string is connected to the household AC power supply directly, the LED bulbs emit light only during the positive half waves and the LEDs produce a 60 Hz glittering. A standard solution to this problem is to insert an AC-DC converter between the AC power supply and the LED string. As implemented by most of existing LED strings, such an AC-DC converter typically takes a four-diode full-wave rectifying circuit.

SUMMARY OF THE INVENTION

An embodiment of the present invention may comprise a capacitive full wave LED light string that is connected to an AC power sources having a first power lead and a second power lead comprising: an LED string module; a first adapter comprising: a first capacitor having a first lead connected to the first power lead of the AC power source and a second lead connected to a first end of the LED string module, the first capacitor having a capacitance that creates an impedance between the first power lead and the LED string module that is sufficient to limit current through the LED string module to prevent damage to the LED string module and cause a positive voltage to be applied to the LED string module whenever a voltage level on the first power lead exceeds a voltage level on the second power lead; a first diode having a cathode connected to the first end of the LED string module and an anode connected to the second power lead; a second adapter comprising: a second capacitor having a first lead connected to the first power lead and a second lead connected to a second end of the LED string module, the second capacitor having a capacitance that creates an impedance between the first power lead and the LED string module that is sufficient to limit current through the LED string module to prevent damage to the LED string module and cause a positive voltage to be applied to the LED string module whenever the voltage level on the second power lead exceeds the voltage level on the first power lead; a second diode having a cathode that is connected to the second power lead and an anode that is connected to the second end of LED string module.

An embodiment of the present invention may further comprise a method of full wave rectification of an AC power source for application to an LED light string module and minimizing power loss comprising: connecting a first lead of a first capacitor to a first power lead of the AC power source; connecting a second lead of the first capacitor to a first end of the LED string module; connecting an anode of the first diode to a second power lead of the AC power source; connecting a cathode of the first diode to the second lead of the first capacitor and the first end of the LED string module; connecting a first lead of a second capacitor to the first power lead of the AC power source; connecting a second lead of the second capacitor to an anode of a second diode and a second end of the LED light string module; connecting an anode of the second diode to the second power lead of the AC power source; selecting a capacitance for the first capacitor that creates an impedance between the first power lead and the LED light string module that is sufficient to limit current through the LED light string module to prevent damage to the LED light string module and cause a positive voltage to be applied to the LED light string module whenever a voltage level on the first power lead exceeds a voltage level on the second power lead; selecting a capacitance for the second capacitor that creates an impedance between the first power lead and the LED light string module that is sufficient to limit current through the LED light string module to prevent damage to the LED light string module and cause a positive voltage to be applied to the LED light string module whenever the voltage level on the second power lead exceeds the voltage level on the first power lead.

DETAILED DESCRIPTION OF THE EMBODIMENTS

Figure 1:
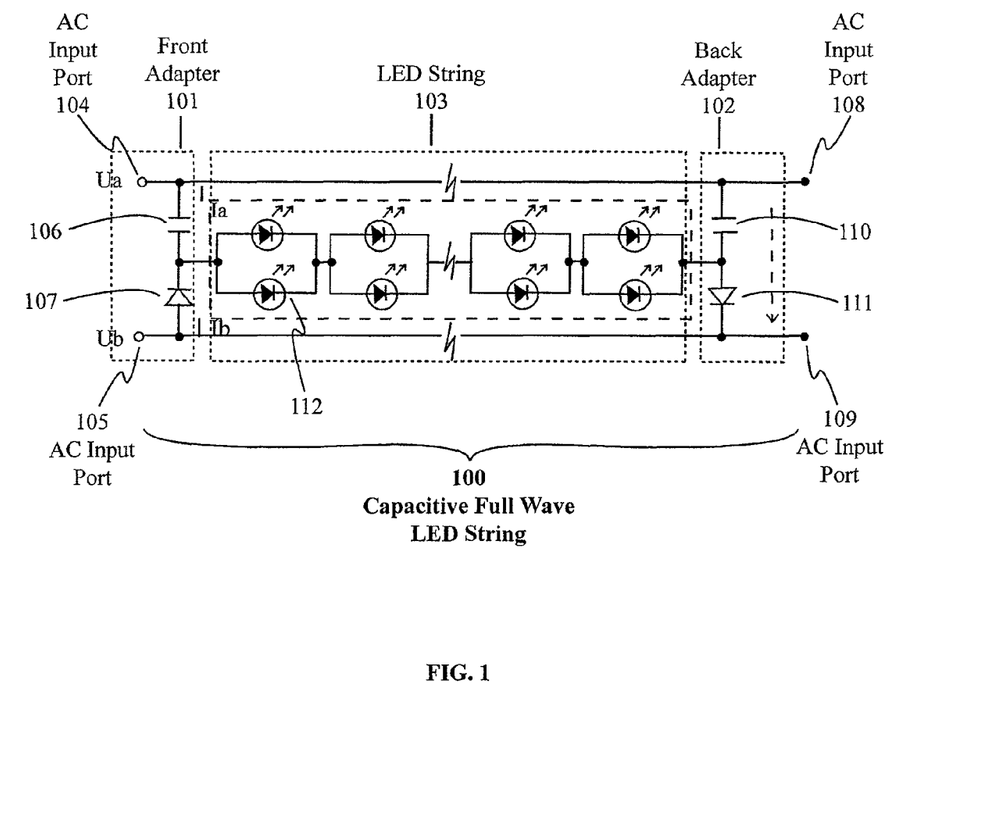
FIG. 1 is a schematic diagram of an embodiment of a capacitive full-wave LED string.

FIG. 1 is a schematic diagram of an embodiment of a capacitive full-wave LED string 100. Existing LED light strings are typically driven by a voltage power supply. Therefore, resistors are often used to match the LEDs operating voltage. One common problem with such LED strings is that one must use different resistors for strings with a different number of LEDs. The resistors often consume as much electrical power as the LEDs. Moreover, if one LED fails, it will affect the rest of LEDs. Therefore, a constant current power supply is the best driver for a LED string. However, current power supplies are not widely used for light strings because of the high cost associated with these current power supplies.

Instead of using four diodes in a traditional full-wave rectifying circuit, the embodiment of FIG. 1 uses two capacitors and two diodes to produce full-wave rectification of an AC power signal for driving a LED string. The capacitive circuit 100 not only dramatically reduces electrical power consumption of the light string, but also provides a nearly constant average current, that is not sensitive to loads, that drives the LED string.

As shown in FIG. 1, the capacitive full-wave LED string 100 comprises three parts: a front adapter 101, a back adapter 102, and a paired LED string 103. The front adapter 101 comprises two input AC ports 104 and 105, a capacitor 106, and a diode 107. The back adapter comprises two output AC ports 108 and 109, a capacitor 110, and a diode 111. The LED string 103 comprises a string of parallel connected LEDs 112.

In operation, during the positive half wave of the AC inputs (i.e., Ua>Ub), the electrical current follows the path from ports 104/108, to capacitor 106, to LED string 103, to diode 111, to ports 105/109. During the negative half wave of the AC inputs (i.e., Ua<Ub), the electrical current follows the path from ports 105/109, to diode 107, to LED string 103, to capacitor 110, to ports 104/108.

The charging and discharging capability of capacitors make it possible for AC current to pass through the circuit. Therefore, a positive full wave is always applied to LED string 103. The capacitors 106, 110 also work as a voltage divider to match the LED operating voltages which is usually much lower than the AC household voltage so that resistors are not needed to limit the current to the LED string 103. Because capacitors have only imaginary impedance, the capacitors consume a very small amount of electrical power, unlike resistors. Moreover, because of the large impedance of capacitors at low frequencies, the slowly varying current component through the LEDs is not sensitive to the number of LEDs. Therefore, the same front adapter 101 and back adapter 102 can be used for strings with different numbers of LEDs without any modification.

Figure 1A:
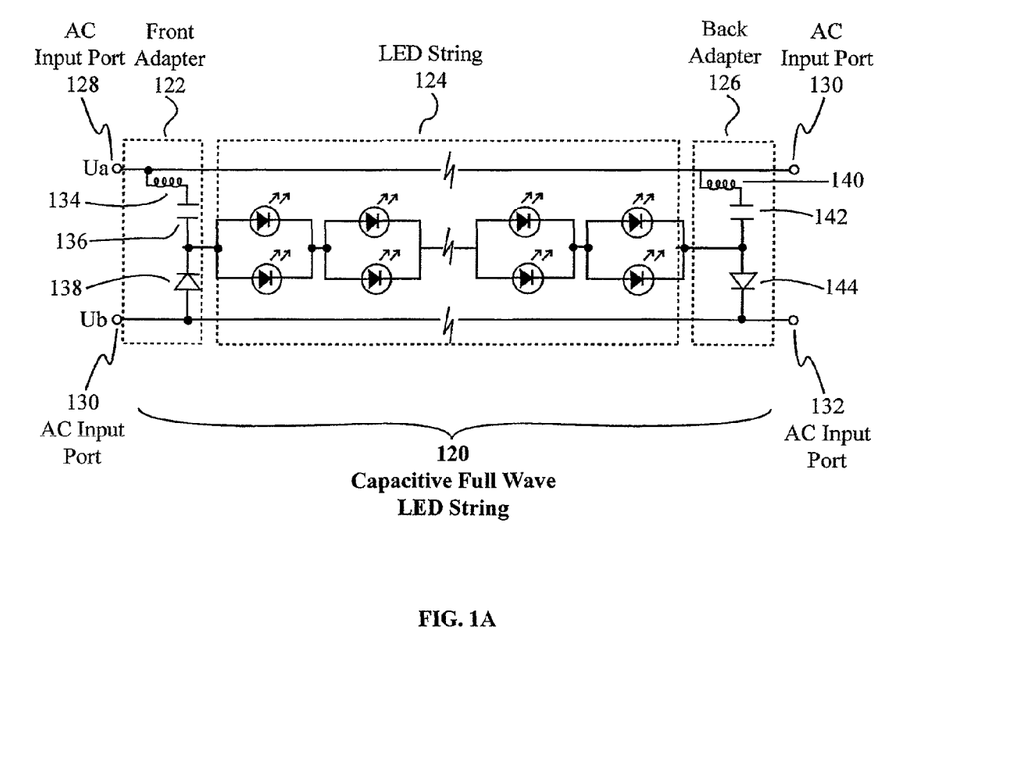

FIG. 1A is another embodiment that is similar to the embodiment of FIG. 1. As shown in FIG. 1A, a full-wave capacitive LED string 120 is shown that includes a front adapter 122, an LED string 124 and a back adapter 126. AC input ports 128, 130 are connected to the front adapter 122. Similarly, AC input ports 130, 132 are connected to back adapter 126. Front adapter 122 includes an inductor 134 that is connected to the AC input port 128 and capacitor 136. The cathode of diode 138 is connected to the capacitor 136 and to the LED string 124. The anode of the diode 138 is connected to the AC input port 130. Back adapter 126 includes a series connected inductor 140 and capacitor 142. One side of the inductor 140 is connected to the AC input port 130, while the other side of the inductor 140 is connected to capacitor 142. An anode of diode 144 is connected to the capacitor 142 and to a second end of the LED string 124. The cathode of diode 144 is connected to the AC input port 132.

The operation of the capacitive full-wave LED string 120, illustrated in FIG. 1A, is similar to the operation of the capacitive full-wave LED string 100, illustrated in FIG. 1. However, inductors 134, 140 have been added to limit current spikes. Current spikes can occur during the charging and discharging of the capacitors 136, 142. Inductors 134, 140 are made sufficiently large to limit the current spikes that may occur as a result of the charging and discharging of the capacitors 136, 142. The advantage of the embodiment illustrated in FIG. 1A is that the inductors 134, 140 and capacitors 136, 142 primarily exhibit imaginary impedance, such that energy is stored in these components. As a result, very little energy is consumed in the front adapter 122 and back adapter 126. As a result, the temperature in the front adapter 122 and back adapter 126 is minimized, which allows the capacitive full-wave LED string 120 to be used in both a safe and efficient manner.

Figure 2:
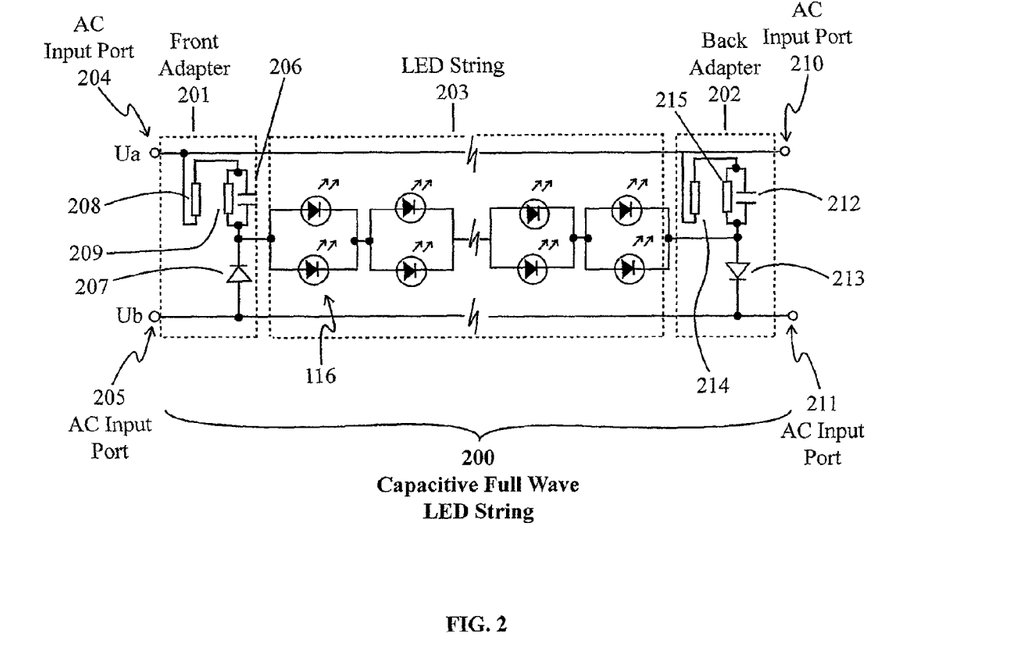
FIG. 2 is a schematic diagram of another embodiment of a capacitive full-wave LED string.

FIG. 2 is a schematic diagram of another embodiment of a capacitive full-wave LED string. The electrical performance of the embodiment in FIG. 1 can be modified by the addition of resistors 208, 209, 214, 215, as shown in FIG. 2. The capacitive full-wave LED string 200, illustrated in FIG. 2, comprises three parts: a front adapter 201, a back adapter 202, and a LED string 203. The front adapter 201 comprises two input AC ports 204 and 205, a capacitor 206, a diode 207, a first resistor 208, and a second resistor 209. The back adapter comprises two output AC ports 210 and 211, a capacitor 212, a diode 213, a first resistor 214, and a second resistor 215. The LED string 103 comprises a string of paired LEDs 112.

During the positive half wave of the AC input (i.e., Ua>Ub), the electrical current follows the path from ports 204/210, to first resistor 208, to capacitor 206/resistor 209, to LEDs 203, to diode 213, to ports 205/211. During the negative half wave of the AC input (i.e., Ua<Ub), the electrical current follows the path from ports 205/211, to diode 207, to LED string 203, to capacitor 212/resistor 215, to resistor 214, to ports 204/210. Hence, a positive full wave signal is always applied to LED string 203.

The principle of operation of the circuit of FIG. 2 is similar to FIG. 1. In the front adapter 201, the resistor 209 is connected in parallel to the capacitor 206. The parallel connection is then connected in series to the resistor 208. In the back adapter 202, the resistor 215 is connected in parallel to the capacitor 212. The parallel connection is then connected in series to the resistor 214. The resistors 208 and 214 are used to limit the charging current of the capacitors during charging periods of the capacitors 206, 212, and the resistors 209 and 215 are used to provide discharging loops for the capacitors 206, 212 during discharging periods. Use of these additional resistors can reduce the charging and discharging current spikes that can occur at the LEDs with, however, some additional power consumption by the added resistors. A series connected inductor can also be used to limit current spikes.

Figure 3:
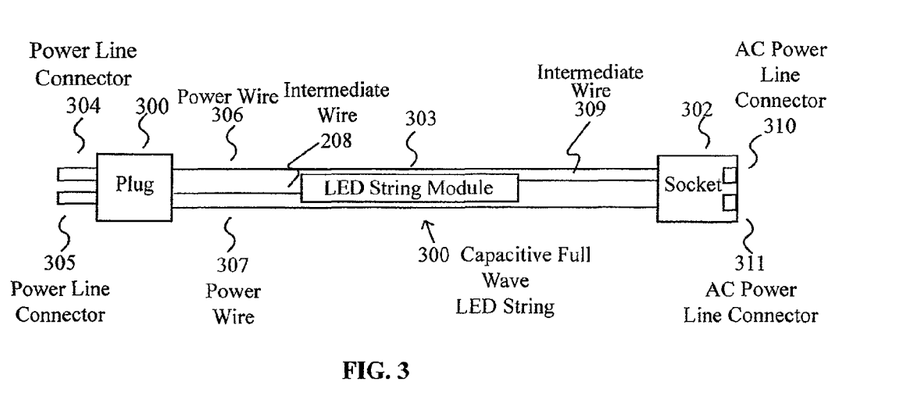
FIG. 3 is a schematic diagram of an implementation of a full-wave LED string module.

FIG. 3 shows an embodiment of the invented capacitive full-wave LED string module implemented with circuits such as illustrated in FIGS. 1 and 2. A capacitive full-wave LED string 300 comprises a front power plug 301, a back power socket 302, a LED string module 303, two power wires 306 and 307 connecting the front power plug 301 and the back power socket 302, an intermediate wire 308 connecting the front power plug 301 and the front part of the LED string module 303, and an intermediate wire 309 connecting the back part of the LED string module 303 to the back power socket 302. The front power plug 301 comprises two AC power line connectors 304 and 305, a capacitive front adapter circuit (101 or 201) (not shown in FIG. 3) that is embedded in plug 301, and three output wires 306, 307 and 308. The back power socket 302 comprises two AC power line connectors 310 and 311, a capacitive back adapter circuit (102 or 202) (not shown in FIG. 3) that is embedded in socket 302, and three input wires 306, 307 and 309.

Figure 4:
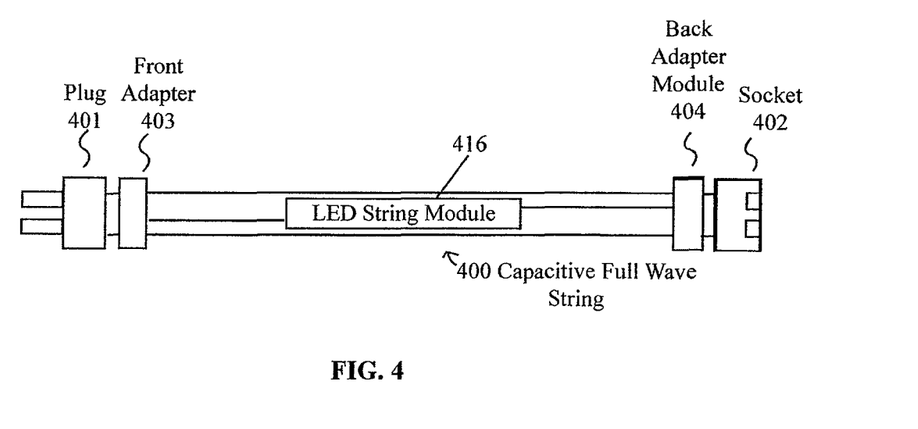
FIG. 4 is a schematic diagram of another implementation of a capacitive full-wave string module.

FIG. 4 shows a second embodiment of a capacitive full-wave string. In this embodiment, the capacitive front and back adapter circuits are not integrated and packaged into the front power plug 401 and back power socket 402, such as shown in FIG. 3. Standard power plug 401 is connected to a front adapter 403. Socket 402 is connected to adapter 404. The front adapter 403 and back adapter 404 are two independent units from power plug 401 and power socket 402. The front adapter 403 is connected between the front power plug 401 and the front part of the LED string module 406. The back adapter 404 is connected between the back power socket 402 and the back part of the LED string module 406.

Hence, a capacitive full-wave electrical circuit for LED light strings is disclosed that makes use of the charging and discharging capability of capacitors. Two capacitors and two diodes are used to realize full-wave rectification to drive a LED string load. A capacitive full-wave LED light string comprises a capacitor and a diode that may or may not be embedded in a front power plug (FIG. 3), a capacitor and a diode that may or may not be embedded in a back power socket (FIGS. 3), and a LED string between the front plug and back socket. The capacitor/diode combination can be included in a module that is separate from the plug/socket. Full-wave rectification is produced by the capacitors and diodes. Besides the full-wave rectification function, the two capacitors have two more advantages. First, compared to a conventional resistor voltage divider circuit, the capacitors consume an extremely small amount of electrical power because of their imaginary impendence. Second, because of the large imaginary impendence of the capacitors, the current is not sensitive to the number of LEDs in the string and therefore the disclosed embodiments can be used with strings having different numbers of LEDs. The electrical current-voltage performance can be further modified by introducing four resistors with a cost of some additional power consumption.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of driving a series of LEDs in an LED light string module using an AC current source and minimizing power loss comprising:
    providing a first adapter that is not connected to a full wave rectifier comprising:
        connecting a first lead of a first capacitor to a first power lead of said AC current source and not to a full bridge rectifier;
        connecting a second lead of said first capacitor to a first end of said LED string module and not to a full bridge rectifier;
        connecting an anode of a first diode, which is not part of a full bridge rectifier, to a second power lead of said AC current source;
        connecting a cathode of said first diode to said second lead of said first capacitor and said first end of said LED string module;
    providing a second adapter that is not connected to a full wave rectifier comprising:
        connecting a first lead of a second capacitor to said first power lead of said AC current source and not to a full bridge rectifier;
        connecting a second lead of said second capacitor to an anode of a second diode and a second end of said LED light string module and not to a full bridge rectifier;
        connecting a cathode of said second diode, which is not part of a full bridge rectifier, to said second power lead of said AC current source;
    selecting a capacitance tor said first capacitor that creates an impedance between said first power lead and said LED light string module that is sufficient to limit current through said LED light string module to prevent damage to said LED light string module and cause a positive voltage to be applied to said LED light string module whenever a voltage level on said first power lead exceeds a voltage level on said second power lead, so that said first capacitor functions as a voltage divider, which divides voltages between said first capacitor and said series of LEDs in said LED light string module, which allows said first adapter to be used with different numbers of LEDs in said LED light string module;
    selecting a capacitance for said second capacitor that creates an impedance between said first power lead and said LED light string module that is sufficient to limit current through said LED light string module to prevent damage to said LED light string module and cause a positive voltage to be applied to said LED light string module whenever said voltage level on said second power lead exceeds said voltage level on said first power lead, so that said second capacitor functions as a voltage divider that divides voltages generated by said AC current source between said second capacitor and said series of LEDs in said LED light string module, which allows said second adapter to be used with different numbers of LEDs in said light string module;
    connecting a first inductor in series between said first lead of said first capacitor and said first power lead;
    connecting a second inductor in series between a first lead of said second capacitor and said first power lead.

2. A method of driving a series of LEDs in an LED light string module using an AC current source and minimizing power loss comprising:
    providing a first adapter that is not connected to a full wave rectifier comprising:
        connecting a first lead of a first capacitor to a first power lead of said AC current source and not to a full bridge rectifier;
        connecting a second lead of said first capacitor to a first end of said LED string module and not to a full bridge rectifier;
        connecting an anode of a first diode, which is not part of a full bridge rectifier, to a second power lead of said AC current source;
        connecting a cathode of said first diode to said second lead of said first capacitor and said first end of said LED string module;
    providing a second adapter that is not connected to a full wave rectifier comprising:
        connecting a first lead of a second capacitor to said first power lead of said AC current source and not to a full bridge rectifier;
        connecting a second lead of said second capacitor to an anode of a second diode and a second end of said LED light string module and not to a full bridge rectifier;
        connecting a cathode of said second diode, which is not part of a full bridge rectifier, to said second power lead of said AC current source;
    selecting a capacitance for said first capacitor that creates an impedance between said first power lead and said LED light string module that is sufficient to limit current through said LED light string module to prevent damage to said LED light string module and cause a positive voltage to be applied to said LED light string module whenever a voltage level on said first power lead exceeds a voltage level on said second power lead, so that said first capacitor functions as a voltage divider, which divides voltages between said first capacitor and said series of LEDs in said LED light string module, which allows said first adapter to be used with different numbers of LEDs in said LED light string module;
    selecting a capacitance for said second capacitor that creates an impedance between said first power lead and said LED light string module that is sufficient to limit current through said LED light string module to prevent damage to said LED light string module and cause a positive voltage to be applied to said LED light string module whenever said voltage level on said second power lead exceeds said voltage level on said first power lead, so that said second capacitor functions as a voltage divider that divides voltages generated by said AC current source between said second capacitor and said series of LEDs in said LED light string module, which allows said second adapter to be used with different numbers of LEDs in said light string module connecting a first resistor in series between said first lead of said first capacitor and said first power lead;

connecting a second resistor in parallel with said first capacitor;

connecting a third resistor in series between said first lead of said second capacitor and said first power lead;

connecting a fourth resistor in parallel with said second capacitor.

3. The method of claim 1 further comprising:

encapsulating said first capacitor and said first diode in a plug of a light string;

encapsulating said second capacitor and said second diode in a socket of a light string.

4. The method of claim 1 further comprising:

encapsulating said first capacitor and said first diode in said first adapter module that is connected to a plug and said LED light string module;

encapsulating said second capacitor and said second diode in said second adapter module that is connected to a socket and said LED light string module.

5. The method of claim 2 further comprising:

encapsulating said first capacitor and said first diode in a plug of a light string;

encapsulating said second capacitor and said second diode in a socket of a light string.

6. The method of claim 2 further comprising:

encapsulating said first capacitor and said first diode in said first adapter module that is connected to a plug and said LED light string module;

encapsulating said second capacitor and said second diode in said second adapter module that is connected to a socket and said LED light string module.

\* \* \* \* \*